United States Patent
Kanno

(10) Patent No.: US 10,291,820 B2
(45) Date of Patent: May 14, 2019

(54) IMAGE PROCESSING APPARATUS, IMAGE PROCESSING SYSTEM, IMAGE PROCESSING METHOD, AND NON-TRANSITORY COMPUTER READABLE MEDIUM FOR REGISTERING RESERVATION PRINTING USERS

(71) Applicant: FUJI XEROX CO., LTD., Tokyo (JP)

(72) Inventor: Eisuke Kanno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/591,267

(22) Filed: May 10, 2017

(65) Prior Publication Data

US 2018/0063374 A1 Mar. 1, 2018

(30) Foreign Application Priority Data

Aug. 23, 2016 (JP) .................................. 2016-162669

(51) Int. Cl.
*H04N 1/00* (2006.01)
*H04N 1/44* (2006.01)

(52) U.S. Cl.
CPC ....... *H04N 1/4426* (2013.01); *H04N 1/00244* (2013.01); *H04N 1/00344* (2013.01); *H04N 1/4413* (2013.01); *H04N 1/4433* (2013.01); *H04N 2201/0094* (2013.01)

(58) Field of Classification Search
CPC .. H04N 1/4406; H04N 1/4433; H04N 1/4413; H04N 1/4426; H04N 1/444
See application file for complete search history.

(56) References Cited

U.S. PATENT DOCUMENTS

2010/0083243 A1* 4/2010 Mincarelli ................ G06F 8/61
717/173
2016/0070511 A1* 3/2016 Nishida ................ H04N 1/0023
358/1.14

FOREIGN PATENT DOCUMENTS

JP 2000-222150 A 8/2000
JP 2010-183358 A 8/2010

* cited by examiner

*Primary Examiner* — Peter K Huntsinger
(74) *Attorney, Agent, or Firm* — Oliff PLC

(57) ABSTRACT

An image processing apparatus includes:
a request unit that requests a print service processing apparatus to register a user who makes a reservation printing as a user who can log in to the print service processing apparatus from the image processing apparatus when the number of times of the reservation printing meets a predetermined condition; and
a setting unit that sets the user to be able to log in to the print service processing apparatus upon receiving an approval for the request for registration.

8 Claims, 13 Drawing Sheets

FIG.5

| DATE/TIME | IMAGE PROCESSING APPARATUS USER ID | RESERVATION NUMBER | SERVICE USER ID (REGISTRANT) |
|---|---|---|---|
| 2016/02/04 18:57:32 | 11 | 4RTYD45 | 50503 |
| 2016/02/04 19:03:10 | 13 | 66UYKTY | 50505 |
| 2016/02/05 08:57:26 | 12 | U909ACV | 50505 |
| 2016/02/05 09:12:54 | 11 | 6GFSD41 | 50503 |
| 2016/02/05 09:14:06 | 11 | 543DF44 | 50503 |
| 2016/02/05 15:32:16 | 12 | FDSA67P | 50502 |
| 2016/02/05 15:40:43 | 12 | 5TWRTYT | 50501 |

FIG.6

| IMAGE PROCESSING APPARATUS USER ID | SERVICE USER ID (REGISTRANT) | PASSWORD HASH |
|---|---|---|
| 12 | 50501 | EA3A5AFF1234BC987D... |

FIG.7

| IMAGE PROCESSING APPARATUS ID | MODEL NAME | SERIAL NUMBER |
|---|---|---|
| 3001 | XXXXXXX | 99000100 |
| 3002 | YYYYYYY | 99085677 |
| 3003 | ZZZZZZZ | 99352311 |
| 3004 | WWWWWWW | 99353422 |
| 3005 | PPPPPPP | 88932433 |

FIG.8

| SERVICE USER ID | LOG-IN ID | PASSWORD HASH |
|---|---|---|
| 50501 | Suzuki | EA3A5AFF1234BC987D··· |
| 50502 | Tanaka | AFC23143AFD1245CFD··· |
| 50503 | Sato | 124CB2AE73DDE34C45··· |
| 50504 | Saito | 65EA423432DACFFF33··· |
| 50505 | Shiraishi | EDF562354DBEA234DD··· |

FIG.9

| IMAGE PROCESSING APPARATUS ID | SERVICE USER ID |
|---|---|
| 3001 | 50501 |
| 3001 | 50505 |
| 3002 | 50502 |
| 3003 | 50501 |
| 3004 | 50504 |
| 3005 | 50505 |

FIG.10

| FILE ID 1010 | RESERVATION NUMBER 1020 | FILE NAME 1030 | FILE SIZE (KB) 1040 | SERVICE USER ID (REGISTRANT) 1050 |
|---|---|---|---|---|
| 4001 | 4RTYD45 | ○○○○ | 1024 | 50503 |
| 4002 | FDSA67P | ××××  | 4342 | 50502 |
| 4003 | 6GFSD41 | △△△△ | 24314 | 50503 |
| 4004 | 66UYKTY | ○○○○ | 3214 | 50505 |
| 4005 | U909ACV | ×××× | 453 | 50505 |
| 4006 | TNVCFGA | □□□□ | 5677 | 50503 |
| 4007 | 543DF44 | ×××× | 7553 | 50503 |
| 4008 | 5TWRTYT | △△△△ | 433 | 50501 |

1000

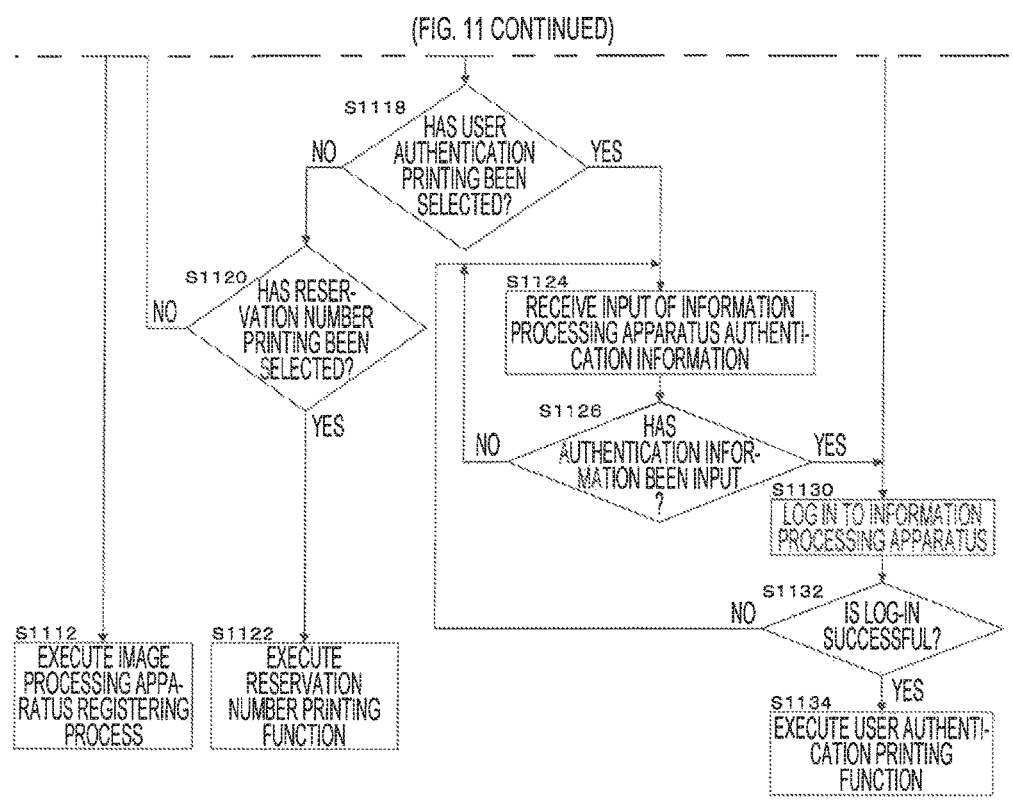

FIG.16

| IMAGE PROCESSING APPARATUS USER ID | SERVICE USER ID (REGISTRANT) | PASSWORD HASH |
|---|---|---|
| 12 | 50501 | EA3A5AFF1234BC987D··· |
| 11 | 50503 | 124CB2AE73DDE34C45··· |

| IMAGE PROCESSING APPARATUS ID | SERVICE USER ID |
|---|---|
| 3001 | 50501 |
| 3001 | 50505 |
| 3002 | 50502 |
| 3003 | 50501 |
| 3004 | 50504 |
| 3005 | 50505 |
| 3001 | 50503 |

1710 1720 1700

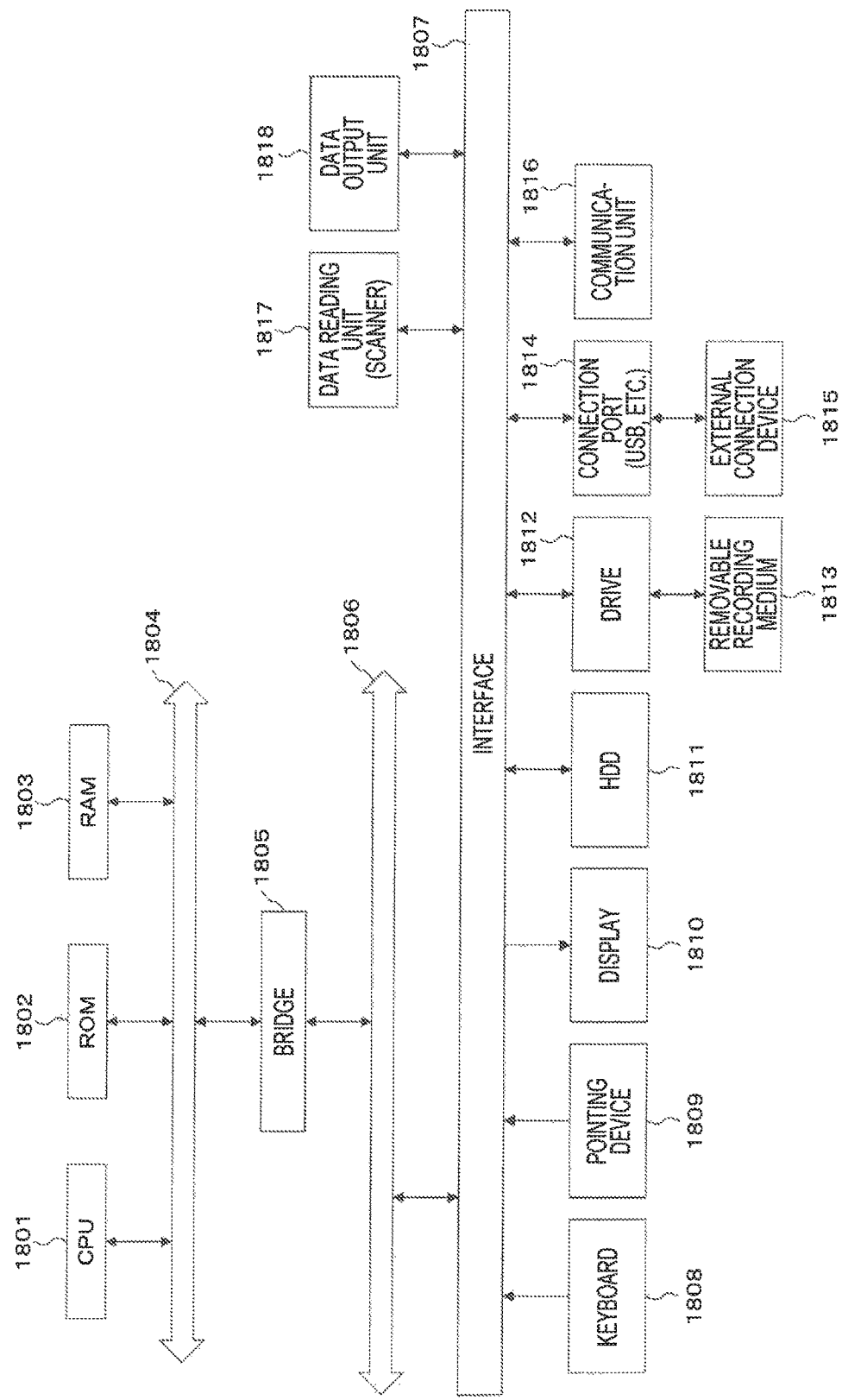

IMAGE PROCESSING APPARATUS, IMAGE
PROCESSING SYSTEM, IMAGE
PROCESSING METHOD, AND
NON-TRANSITORY COMPUTER READABLE
MEDIUM FOR REGISTERING
RESERVATION PRINTING USERS

CROSS-REFERENCE TO RELATED
APPLICATIONS

This application is based on and claims priority under 35 USC 119 from Japanese Patent Application No. 2016-162669 filed Aug. 23, 2016.

BACKGROUND

Technical Field

The present invention relates to an image processing apparatus, an image processing system, an image processing method, and a non-transitory computer readable medium.

SUMMARY

According to an aspect of the invention, an image processing apparatus includes:
a request unit that requests a print service processing apparatus to register a user who makes a reservation printing as a user who can log in to the print service processing apparatus from the image processing apparatus when the number of times of the reservation printing meets a predetermined condition; and
a setting unit that sets the user to be able to log in to the print service processing apparatus upon receiving an approval for the request for registration.

BRIEF DESCRIPTION OF THE DRAWINGS

Exemplary embodiments of the present invention will be described in detail based on the following figures, wherein:

FIG. 5 is an explanatory view illustrating a data structure example of a reservation number print history table;

FIG. 6 is an explanatory view illustrating a data structure example of an image processing apparatus/print service user association information table;

FIG. 7 is an explanatory view illustrating a data structure example of an image processing apparatus information table;

FIG. 8 is an explanatory view illustrating a data structure example of a print service user information table;

FIG. 9 is an explanatory view illustrating a data structure example of an image processing apparatus public setting information table;

FIG. 10 is an explanatory view illustrating a data structure example of a file information table;

FIG. 16 is an explanatory view illustrating a data structure example of an image processing apparatus/print service user association information table;

FIG. 17 is an explanatory view illustrating a data structure example of an image processing apparatus public setting information table; and FIG. 18 is a block diagram illustrating a hardware configuration example of a computer that implements the exemplary embodiment.

DETAILED DESCRIPTION

Hereinafter, an exemplary embodiment suitable to implement the present invention will be described with reference to the drawings.

Figure 1:
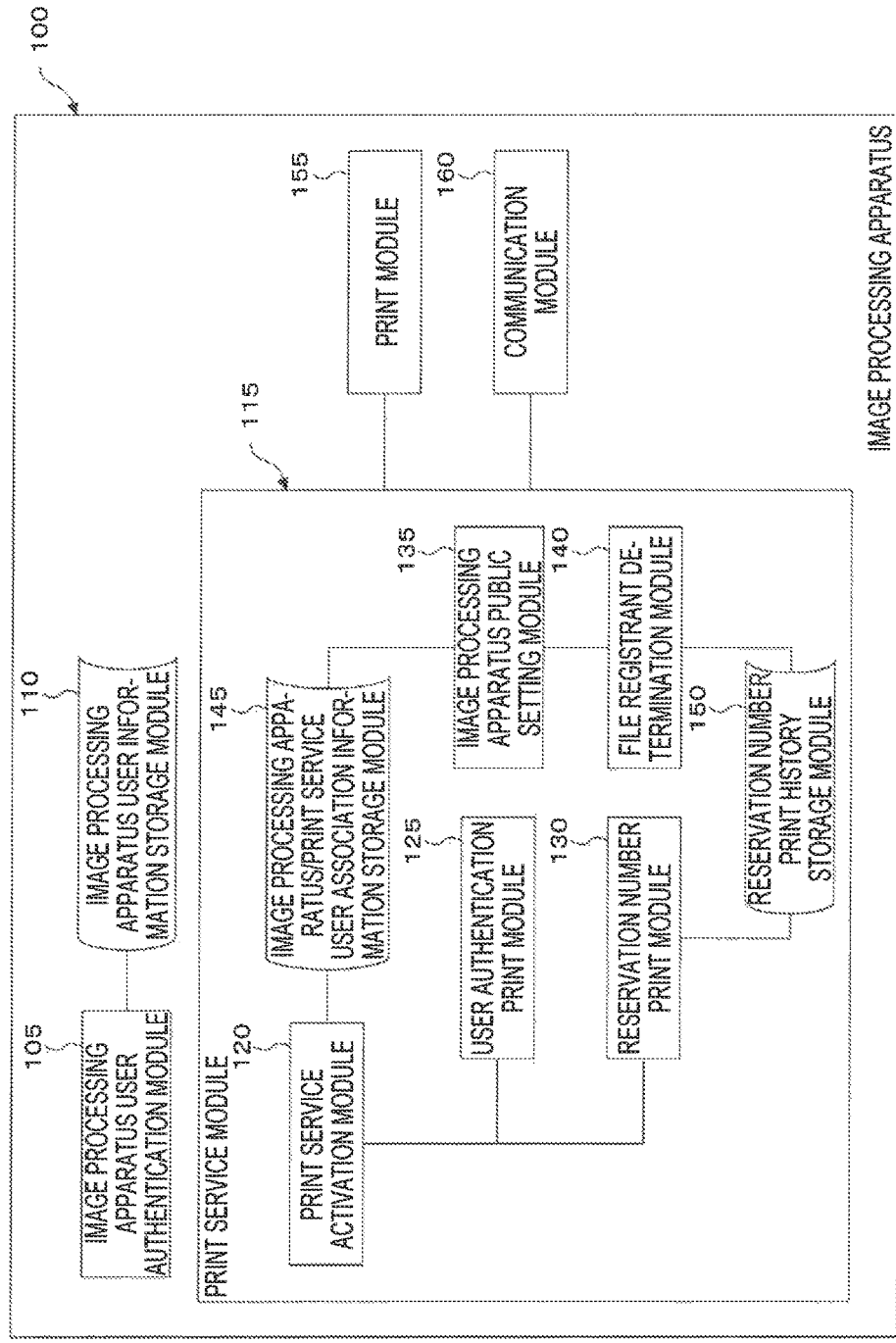
FIG. 1 is a view illustrating a conceptual module configuration of a configuration example of an image processing apparatus.

FIG. 1 illustrates a conceptual module configuration view of a configuration example of an exemplary embodiment (image processing apparatus 100) of the present invention.

As used herein, the term "module" generally refers to a component such as software (computer program), hardware or the like that can be logically separated. Therefore, the module in the exemplary embodiment refers to not only a module in a computer program but also a module in a hardware configuration. Therefore, the exemplary embodiment further involves a computer program for causing a computer to function as these modules (a program for causing a computer to execute each procedure, a program for causing a computer to function as each unit, or a program for causing a computer to realize each function), a system and a method. For the sake of convenience of explanation, however, the phrase "store" or "being stored" and the wordings equivalent thereto mean that a computer program of the exemplary embodiment is stored in a storage device or is controlled to be stored in the storage device. In addition, although modules may be in one-to-one correspondence with functions, in implementation, one module may be configured by one program, or plural modules may be configured by one program and vice versa. Further, plural modules may be executed by one computer, or one module may be executed by plural computers in a distributed or parallel environment. Further, one module may include another module. The term "connection" used herein is intended to include logical connection (data exchange, instruction, reference relation between data, etc.) in addition to physical connection. The term "predetermined" used herein refers to being determined before a targeted process and, more specifically, means being determined not only before a process according to the exemplary embodiment is started but also before a targeted process even after the process according to the exemplary embodiment is started, in accordance with the situation/state at that time or the situation/state so far. When there are plural "predetermined values", the predetermined values may be different from each other, or two or more (including all, of course) of the values may be the same. In addition, a statement "in a case of A, B is performed" is meant "to determine whether or not it is A and to perform B when it is determined to be A". However, a case where it is unnecessary to determine whether or not it is A is excluded.

Further, a system or an apparatus is meant to include plural computers, hardware, devices and the like connected by a communication unit such as a network (including a one-to-one correspondence communication connection), as well as a single computer, hardware, a device and the like. The "apparatus" and the "system" may be used synonymously. Of course, the "system" does not include things that are merely a social "mechanism" (social system) which is an artificial arrangement.

In addition, targeted information is read from a storage device for each process by each module and each process is performed, or if plural processes are performed in a module, targeted information is read from the storage device for each of the plural processes and each process is performed. Then, a process result is stored in the storage device. Therefore, description of reading from the storage device before processing and storing in the storage device after processing may be omitted in some cases. The term "storage device" used herein may include a hard disk, a random access memory (RAM), an external storage medium, a storage device via a communication line, a register in a central processing unit (CPU), and the like.

The image processing apparatus 100 according to the exemplary embodiment is provided to print a document and includes an image processing apparatus user authentication module 105, an image processing apparatus user information storage module 110, a print service module 115, a print module 155 and a communication module 160, as illustrated in FIG. 1.

The image processing apparatus 100 provides a user with a print service having the following two printing functions, in cooperation with an information processing apparatus 200 which is a print service processing apparatus.

(1) User Authentication Printing
  In accordance with an operation of a user who logs in from the image processing apparatus 100 to the information processing apparatus 200, a document which is registered in advance in the information processing apparatus 200 is printed. For example, a list of documents in the information processing apparatus 200 is presented to the user by the image processing apparatus 100 and a file selected from the list is printed.
  A user who can log in to the information processing apparatus 200 is determined for each image processing apparatus 100.

(2) Reservation Number Printing (Hereinafter Also Referred to as Reservation Printing)
  A reservation number is input to the image processing apparatus 100 and a document corresponding to the reservation number on the information processing apparatus 200 is printed. Incidentally, the reservation number may include not only numerals but also alphanumeric characters, symbols, hiragana, katakana, Chinese characters, and the like. When a document is registered in the information processing apparatus 200, the reservation number is presented to the user from the information processing apparatus 200 and the reservation number and the document are associated with each other.
  With this reservation number printing, logging in to the information processing apparatus 200 is unnecessary. However, it is necessary to log in to the image processing apparatus 100 in the first place (this is a case where the image processing apparatus 100 requires log-in).

The term "document" (hereinafter also referred to as a "file") used herein refers to a target of printing, storage, editing and searching, such as text data, numerical data, graphic data, image data or a combination thereof. That is, the "document" is intended to include those which can be exchanged as individual units between systems or users, including those similar thereto. Specifically, it includes a document created by a document creation program, an image read by an image reading device (scanner or the like), a Web page, and the like.

Further, the information processing apparatus 200 may be a single apparatus or plural apparatuses. More specifically, it may be a computer called a server, a cloud (server group), or the like. Hereinafter, a service will be illustrated with a cloud service.

The image processing apparatus user authentication module 105 is connected to the image processing apparatus user information storage module 110. The image processing apparatus user authentication module 105 has an authentication function as the image processing apparatus 100. Apart from the user authentication function of the information processing apparatus 200, a user is also managed separately. For example, the image processing apparatus user authentication module 105 checks that a user is registered in the image processing apparatus user information storage module 110 (log-in processing). For example, the image processing apparatus user authentication module 105 may receive a user ID (IDentification), a password, and the like through a keyboard or the like operated by the user and collate the received ID, the received password and the like with user IDs, passwords, and the like which are registered in the image processing apparatus user information storage module 110 in advance. Alternatively, an IC card possessed by the user may be read using an IC card reader or the like so as to collate information stored in the IC card. As another alternative, biometric authentication such as fingerprint or the like may be used.

Further, when the client function (user authentication print) of a print service is activated in the image processing apparatus 100, the image processing apparatus user authentication module 105 may refer to information stored in an image processing apparatus/print service user association information storage module 145 to automatically log in to the information processing apparatus 200. When a user who logs in to the image processing apparatus 100 is a user stored in the image processing apparatus/print service user association information storage module 145, the user may automatically log in to the information processing apparatus 200. Then, a document list screen for user authentication printing is displayed on a user authentication print module 125.

Figures 3, 4:
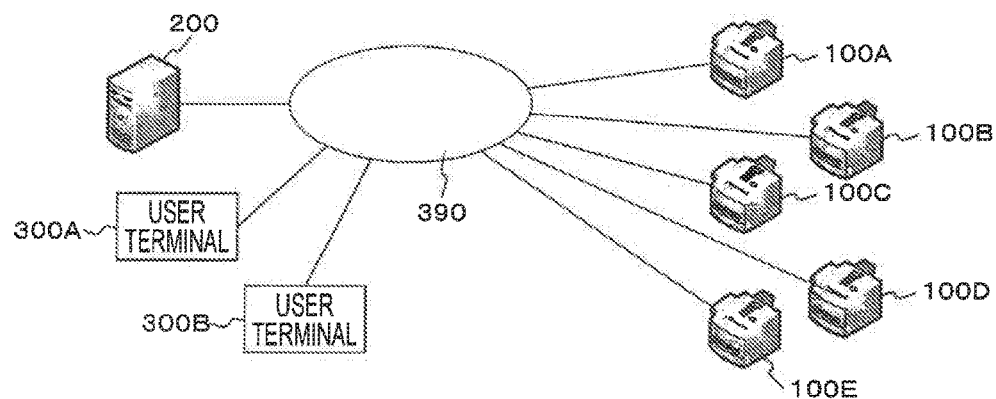
FIG. 3 is an explanatory view illustrating a configuration example of a system according to an exemplary embodiment.
FIG. 4 is an explanatory view illustrating a data structure example of an image processing apparatus user information table.

The image processing apparatus user information storage module 110 is connected to the image processing apparatus user authentication module 105. The image processing apparatus user information storage module 110 stores authentication information (information required for collation of authentication) of a user who can log in to the image processing apparatus 100. For example, an image processing apparatus user information table 400 is stored in the image processing apparatus user information storage module 110. FIG. 4 is an explanatory view illustrating a data structure example of the image processing apparatus user information table 400. The image processing apparatus user information table 400 has an image processing apparatus user ID column 410 and a log-in ID column 420. In the exemplary embodiment, the image processing apparatus user ID column 410 stores information (image processing apparatus user ID: IDentification) for uniquely identifying a user in the image processing apparatus 100. In the exemplary embodiment, the login ID column 420 stores information (login ID) for uniquely identifying a login. In addition to these, a password or the like may be stored. The image processing apparatus user information storage module 110 is not necessarily in the image processing apparatus 100 but may be in an external server or the like (for example, the information processing apparatus 200 or the like).

The print module 155 is connected to the print service module 115. The print module 155 has a function as a printer to print a document under control by the print service module 115.

The communication module 160 is connected to the print service module 115. Under control by the print service module 115, the communication module 160 communicates with the information processing apparatus 200 or the like as a print service processing apparatus.

The print service module 115 includes a print service activation module 120, a user authentication print module 125, a reservation number print module 130, an image processing apparatus public setting module 135, a file registrant determination module 140, an image processing apparatus/print service user association information storage module 145 and a reservation number print history storage module 150 and is connected to the print module 155 and the communication module 160. The print service module 115 has a client function of print service.

The print service activation module 120 is connected to the user authentication print module 125, the reservation number print module 130 and the image processing apparatus/print service user association information storage module 145. The print service activation module 120 activates one of the user authentication print module 125 and the reservation number print module 130 in accordance with a user authenticated by the image processing apparatus user authentication module 105.

The print service activation module 120 enables designation of reservation printing when a user who logs in to the image processing apparatus 100 is not a user who can log in to the information processing apparatus 200.

Then, when the user who logs in to the image processing apparatus 100 is a user who can log in to the information processing apparatus 200, the print service activation module 120 logs in to the information processing apparatus 200 according to settings in the image processing apparatus/print service user association information storage module 145.

The user authentication print module 125 is connected to the print service activation module 120. The user authentication print module 125 has the above-described user authentication printing function. The user authentication print module 125 controls the print module 155 to print a document registered in advance in the information processing apparatus 200 in accordance with an operation of the user who logged in from the image processing apparatus 100 to the information processing apparatus 200.

The reservation number print module 130 is connected to the print service activation module 120 and the reservation number print history storage module 150. The reservation number print module 130 has the above-described reservation number printing function. The reservation number print module 130 inputs a reservation number to the image processing apparatus 100 and controls the print module 155 to print a document corresponding to the reservation number on the information processing apparatus 200.

The image processing apparatus public setting module 135 is connected to the file registrant determination module 140 and the image processing apparatus/print service user association information storage module 145. The image processing apparatus public setting module 135 receives from the user a password of a document registrant of the print service (information processing apparatus 200) and notifies it to the information processing apparatus 200. This password acts as a trigger to change a setting to allow the document registrant (user) to log in to the image processing apparatus 100. Specifically, the following process is performed.

When the number of times of the reservation printing meets a predetermined condition, the image processing apparatus public setting module 135 requests the information processing apparatus 200 to register a user who has performed the reserved printing, as a user who can log in to the information processing apparatus 200 from the image processing apparatus 100. Specifically, the image processing apparatus public setting module 135 transmits a request for registration to the information processing apparatus 200 via the communication module 160. Further, the condition in "a case where a predetermined condition targeting the number of times of the reservation printing is satisfied" may include, for example, (1) the number of times of the reservation printing may be equal to or greater than a predetermined threshold value, (2) the number of times of the reservation printing may be ranked in descending order and fall within a predetermined order, or (3) the number of times of the reservation printing may be equal or greater than a predetermined ratio. In addition, the number of times in these conditions may be the recent number of times or counts within the most recent period. Specifically, under the condition (3), the number of times may be a ratio in the last 10 times of reservation printings performed in the image processing apparatus 100 or a ratio in the last one week of reservation printings performed in the image processing apparatus 100.

Then, upon receiving an approval (so-called OK) for the request for registration from the information processing apparatus 200, the image processing apparatus public setting module 135 sets the user to be able to log in to the information processing apparatus 200.

In addition, the image processing apparatus public setting module 135 may count the number of times of the reservation printing for each registrant of a document to be subjected to the reserved printing.

Then, the image processing apparatus public setting module 135 may request the information processing apparatus 200 to register the registrant as a user who can log in to the information processing apparatus 200.

The file registrant determination module 140 is connected to the image processing apparatus public setting module 135 and the reservation number print history storage module 150. The file registrant determination module 140 determines which document registrant's document a log-in user of the image processing apparatus 100 is printing from a print history in the reservation number print history storage module 150. Based on a result of the determination, the file registrant determination module 140 specifies a document registrant of the print service (information processing apparatus 200) who may be the same person as the log-in user of the image processing apparatus 100.

The reservation number print history storage module 150 is connected to the reservation number print module 130 and the file registrant determination module 140. The reservation number print history storage module 150 manages a print history associating the log-in user of the image processing apparatus 100 with the document registrant of the print service (information processing apparatus 200). For example, a reservation number print history table 500 is stored in the reservation number print history storage module 150. FIG. 5 is an explanatory view illustrating a data structure example of the reservation number print history table 500. The reservation number print history table 500 has a date/time column 510, an image processing apparatus user ID column 520, a reservation number column 530 and a service user ID (registrant) column 540. The date/time column 510 stores date/time (year, month, day, hour, minute, second or less, or a combination thereof). The image processing apparatus user ID column 520 stores user IDs in the image processing apparatus 100. The reservation number column 530 stores reservation numbers on which a printing process has been performed. In the exemplary embodiment, the service user ID (registrant) column 540 stores information (service user ID (registrant) ID) for uniquely identifying a service user (a registrant in the information processing apparatus 200).

For example, assumes that a user of the service user ID: 50503 cannot log in to the print service (information processing apparatus 200) from the image processing apparatus ID: 3001 (see an image processing apparatus public setting information table 900 illustrated in the example of FIG. 9 to be described later). However, a user of the image processing apparatus user ID: 11 is outputting (printing) a number of documents registered by the service user ID: 50503 (outputting three times in the example of FIG. 5). Therefore, this user (service user ID: 50503 and image processing apparatus user ID: 11) is a target of a user who can log in to the print service (information processing apparatus 200).

The image processing apparatus/print service user association information storage module 145 is connected to the print service activation module 120 and the image processing apparatus public setting module 135. The image processing apparatus/print service user association information storage module 145 stores the correspondence between a user who can log in to the image processing apparatus 100 and a user registered in the print service (information processing apparatus 200). That is, a log-in user of the image processing apparatus 100, a file registrant and a password in the file registrant are stored in association with each other. The image processing apparatus/print service user association information storage module 145 stores, for example, an image processing apparatus/print service user association information table 600. FIG. 6 is an explanatory view illustrating a data structure example of the image processing apparatus/print service user association information table 600. The image processing apparatus/print service user association information table 600 has an image processing apparatus user ID column 610, a service user ID (registrant) column 620 and a password hash column 630. The image processing apparatus user ID column 610 stores an image processing apparatus user ID. The service user ID (registrant) column 620 stores a service user ID (registrant). The password hash column 630 stores a password hash.

Each row of the image processing apparatus/print service user association information table 600 is created when an approval for "requesting the information processing apparatus 200 to register a user who can log in to the information processing apparatus 200 from the image processing apparatus 100" performed by the image processing apparatus 100 is received from the information processing apparatus 200.

Figure 2:
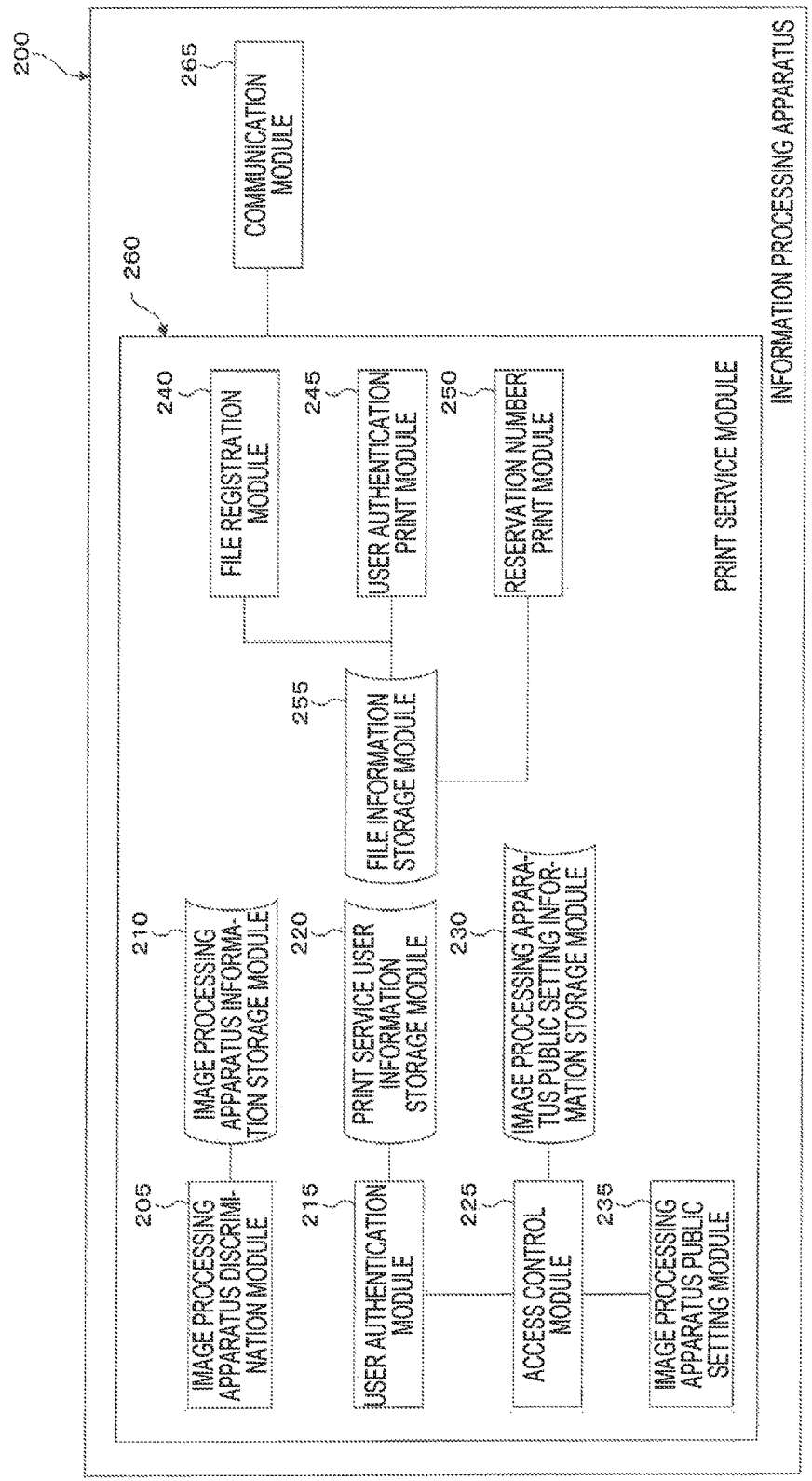
FIG. 2 is a view illustrating a conceptual module configuration of a configuration example of an information processing apparatus.

FIG. 2 is a view illustrating a conceptual module configuration of a configuration example of the exemplary embodiment (information processing apparatus 200). The information processing apparatus 200 has a function as a print service processing apparatus and passes a document to be printed in accordance with an instruction from the image processing apparatus 100. In addition, the information processing apparatus 200 manages users who can log in to the information processing apparatus 200 via the image processing apparatus 100.

The information processing apparatus 200 has a print service module 260 and a communication module 265.

The communication module 265 is connected to the print service module 260. The communication module 265 communicates with the image processing apparatus 100 and the like under control by the print service module 260.

The print service module 260 includes an image processing apparatus discrimination module 205, an image processing apparatus information storage module 210, a user authentication module 215, a print service user information storage module 220, an access control module 225, an image processing apparatus public setting information storage module 230, an image processing apparatus public setting module 235, a file registration module 240, a user authentication print module 245, a reservation number print module 250 and a file information storage module 255 and is connected to the communication module 265. The print service module 260 has a print service function.

The image processing apparatus discrimination module 205 is connected to the image processing apparatus information storage module 210. The image processing apparatus discrimination module 205 discriminates an image processing apparatus 100 that can use the print service. That is, the image processing apparatus 100 that has made communication for the print service determines whether or not the print service can be used, using information in the image processing apparatus information storage module 210. For example, apparatuses other than the image processing apparatus 100 which has been registered in advance may make no access to the print service.

The image processing apparatus information storage module 210 is connected to the image processing apparatus discrimination module 205. The image processing apparatus information storage module 210 stores information of the image processing apparatus 100 that can use the print service. For example, an image processing apparatus information table 700 is stored in the image processing apparatus information storage module 210. FIG. 7 is an explanatory view illustrating a data structure example of the image processing apparatus information table 700. The image processing apparatus information table 700 has an image processing apparatus ID column 710, a model name column 720 and a serial number column 730. In the exemplary embodiment, the image processing apparatus ID column 710 stores information (image processing apparatus ID) for uniquely identifying the image processing apparatus that can use the print service. The model name column 720 stores a model name of the image processing apparatus. The serial number column 730 stores a serial number of the image processing apparatus. When a serial number received from the image processing apparatus 100 is within the image processing apparatus information table 700 (serial number column 730), the image processing apparatus 100 is determined to be the image processing apparatus 100 that can use the print service.

The user authentication module 215 is connected to the print service user information storage module 220 and the access control module 225. The user authentication module 215 has an authentication function as a print service. Apart from the user authentication function of the image processing apparatus 100 (image processing apparatus user authentication module 105), the user is also managed separately. However, the user authentication module 215 has the same function as the image processing apparatus user authentication module 105.

The print service user information storage module 220 is connected to the user authentication module 215. The print service user information storage module 220 stores information of users registered in the print service (information processing apparatus 200). For example, a print service user information table 800 is stored in the print service user information storage module 220. FIG. 8 is an explanatory view illustrating a data structure example of the print service user information table 800. The print service user information table 800 has a service user ID column 810, a log-in ID column 820 and a password hash column 830. In the exemplary embodiment, the service user ID column 810 stores information (service user ID) for uniquely identifying a service user. The log-in ID column 820 stores a log-in ID. The password hash column 830 stores a password hash. Of course, a password itself may be stored, but in general, the password is protected using a hash function. The print service user information storage module 220 is not necessarily located within the information processing apparatus 200, but may be located in an external server or the like (for example, other information processing apparatus 200 or the like).

The access control module 225 is connected to the user authentication module 215, the image processing apparatus public setting information storage module 230 and the image processing apparatus public setting module 235. Using the image processing apparatus public setting information storage module 230, the access control module 225 manages which user can log in to the information processing apparatus 200 from each image processing apparatus 100.

The image processing apparatus public setting information storage module 230 is connected to the access control module 225. The image processing apparatus public setting information storage module 230 stores a user who can login to the print service via the image processing apparatus 100 (a combination of the image processing apparatus 100 and the user). For example, an image processing apparatus public setting information table 900 is stored in the image processing apparatus public setting information storage module 230. FIG. 9 is an explanatory view illustrating a data structure example of the image processing apparatus public setting information table 900. The image processing apparatus public setting information table 900 has an image processing apparatus ID column 910 and a service user ID column 920. The image processing apparatus ID column 910 stores an image processing apparatus ID of the image processing apparatus 100. The service user ID column 920 stores a service user ID of a user who can log in to the print service from the image processing apparatus 100. The image processing apparatus public setting information table 900 stores a set of information (image processing apparatus ID) on the image processing apparatus 100 and user information (service user ID) in the print service. In the example of FIG. 9, Suzuki of a service user number: 50501 can log in to the information processing apparatus 200 from the image processing apparatuses 100 of image processing apparatus numbers: 3001 and 3003, but Sato of a service user number: 50503 cannot log in to the information processing apparatus 200 from any image processing apparatuses 100.

The image processing apparatus public setting module 235 is connected to the access control module 225. The image processing apparatus public setting module 235 receives a request for registration from the image processing apparatus 100. If a user in the registration request is a user who can log in to the information processing apparatus 200, the image processing apparatus public setting module 235 sets the user in the registration request as the user who can log in to the information processing apparatus 200 from the image processing apparatus 100, and transmits a message indicating an approval to the image processing apparatus 100.

For example, the image processing apparatus public setting module 235 performs a process corresponding to an image processing apparatus public setting request from the image processing apparatus 100 (request for registration in the information processing apparatus 200 as a user who can log in to the information processing apparatus 200 from the image processing apparatus 100). That is, the user authentication module 215 checks whether or not a password received from the image processing apparatus 100 is a password of a file registrant. If the received password is the password of the file registrant, the access control module 225 is called to change a setting so that the file registrant can log in to the informed image processing apparatus 100. As a result, the user of the image processing apparatus 100 can use the user authentication printing function in the print service with the image processing apparatus 100 from next time.

The file registration module 240 is connected to the file information storage module 255. The file registration module 240 registers a document in the file information storage module 255 according to an operation of the service user.

The user authentication print module 245 is connected to the file information storage module 255. The user authentication print module 245 has a function of user authentication printing in the print service. That is, in a case where there is an instruction by user authentication printing from the image processing apparatus 100, a list of documents registered by the user (service user) is transmitted to the image processing apparatus 100, and a selected document is extracted from the file information storage module 255 and transmitted to the image processing apparatus 100.

The reservation number print module 250 is connected to the file information storage module 255. The reservation number print module 250 has a function of reservation number printing in the print service. That is, in a case where an instruction by reservation number printing is issued from the image processing apparatus 100, a document corresponding to the reservation number is extracted from the file information storage module 255 and transmitted to the image processing apparatus 100.

The file information storage module 255 is connected to the file registration module 240, the user authentication print module 245 and the reservation number print module 250. The file information storage module 255 stores information of a document to be printed. For example, a file information table 1000 is stored in the file information storage module 255. FIG. 10 is an explanatory view illustrating a data structure example of the file information table 1000. The file information table 1000 has a file ID column 1010, a reservation number column 1020, a file name column 1030, a file size (KB) column 1040 and a service user ID (registrant) column 1050. In the exemplary embodiment, the file ID column 1010 stores information (file ID) for uniquely identifying a file that is a document. The reservation number column 1020 stores a reservation number for printing the document. The file name column 1030 stores a file name (such as a URL (Uniform Resource Locator) or the like) of the file. The file size (KB) column 1040 stores a size (KB) of the file. The service user ID (registrant) column 1050 stores a service user ID (registrant) of a user who registered the file in the print service.

FIG. 3 is an explanatory view illustrating a configuration example of the system according to the exemplary embodiment.

An image processing apparatus 100A, an image processing apparatus 100B, an image processing apparatus 100C, an image processing apparatus 100D, an image processing apparatus 100E, an information processing apparatus 200, a user terminal 300A and a user terminal 300B are interconnected via a communication line 390. The communication line 390 may be wireless, wired, or a combination thereof. For example, the communication line 390 may be the Internet, an intranet, or the like as a communication infrastructure. Further, the function of the information processing apparatus 200 may be realized as a cloud service.

A user uses a user terminal 300 (300A or 300B) to register a document in the information processing apparatus 200. At that time, the information processing apparatus 200 transmits a reservation number to the user terminal 300, and the user terminal 300 presents it to the user. That is, the user acquires the reservation number. Then, the information processing apparatus 200 uses a print service capable of printing the document registered in the information processing apparatus 200 in the image processing apparatus 100.

Consider a case where a user meeting the following conditions uses the print service.

The user can log in to the image processing apparatus 100.

Although the user is a user of the print service (information processing apparatus 200), the user is unable to log in to the information processing apparatus 200 from the image processing apparatus 100 in settings.

In using the print service, even if the user cannot log in to the information processing apparatus 200 from the image processing apparatus 100, it is possible to print the reservation number in the image processing apparatus 100, as follows.

When a reservation number is designated from the image processing apparatus 100, the information processing apparatus 200 returns a document and information of a registrant of the document to the image processing apparatus 100.

The image processing apparatus 100 executes the following process using the returned information.

Print a document (a document corresponding to the reservation numbers).

Create a print history associating the log-in user of the image processing apparatus 100 with a registrant of the document and save it in the image processing apparatus 100.

The image processing apparatus 100 checks a registrant of a document that the log-in user of the image processing apparatus 100 has printed, from the saved print history. Then, if it is determined that a specific document registrant has printed a number of documents, the following process is executed.

The image processing apparatus 100 prompts the user to input a password of the print service (information processing apparatus 200) and transmits the password to the information processing apparatus 200.

The information processing apparatus 200 collates the received password with a password of the document registrant.

If the passwords match in this collation, (1) The information processing apparatus 200 executes the following process.

The information processing apparatus 200 changes the setting so that a file registrant can log in from the image processing apparatus 100 to the information processing apparatus 200. (2) The image processing apparatus 100 executes the following process.

The image processing apparatus 100 saves a table associating an input password, a document registrant and a log-in user of the image processing apparatus 100.

With this table saved in the image processing apparatus 100, when the print service is activated, the log-in user can automatically log in to the information processing apparatus 200 to open a file list screen of user authentication print.

Figure 11:
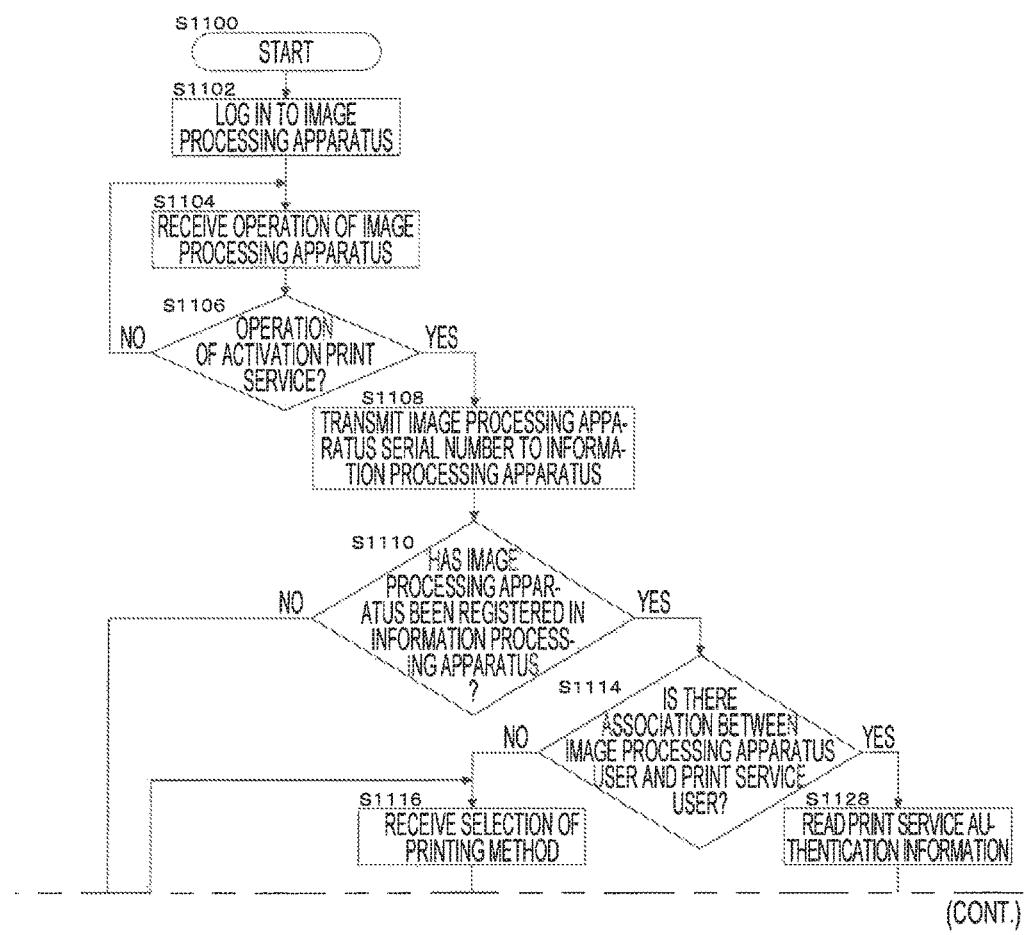
FIG. 11 is a flowchart illustrating an example of processing by the image processing apparatus and the information processing apparatus.

FIG. 11 is a flowchart illustrating an example of processing by the image processing apparatus 100 and the information processing apparatus 200. FIG. 11 illustrates an example of a process of activating a print service in the image processing apparatus 100 and the information processing apparatus 200. More specifically, it illustrates an example of processing from the start of the print service in the image processing apparatus 100 to the start of the user authentication printing or the reservation number printing.

In step S1102, a user logs in to the image processing apparatus 100. Then, log-in processing is performed by the image processing apparatus user authentication module 105.

In step S1104, a user's operation with respect to the image processing apparatus 100 is received.

In step S1106, it is determined whether or not the user's operation is an operation of activation of the print service. When it is determined that the user's operation is an operation of activation of the print service, the process proceeds to step S1108. Otherwise, the process returns to step S1104 (or a process in accordance with another operation may be performed).

In step S1108, the image processing apparatus 100 transmits a serial number of the image processing apparatus 100 to the information processing apparatus 200.

In step S1110, it is determined whether or not the image processing apparatus 100 has already been registered in the information processing apparatus 200. When the image processing apparatus 100 has already been registered, the process proceeds to step S1114. Otherwise, the process proceeds to step S1112. More specifically, the image processing apparatus discrimination module 205 determines whether or not the serial number of the image processing apparatus 100 is registered in the image processing apparatus information table 700 (the serial number column 730) in the image processing apparatus information storage module 210.

In step S1112, a process of registration of the image processing apparatus 100 in the print service is executed. Alternatively, a notification indicating that the print service cannot be used in the image processing apparatus 100 may be presented to the user.

In step S1114, it is determined whether or not there is an association between an image processing apparatus user and a print service user. When it is determined that there is an association between an image processing apparatus user and a print service user, the process proceeds to step S1128. Otherwise, the process proceeds to step S1116. Information of the user (for example, an log-in ID, etc.) is being received from the image processing apparatus 100, the log-in ID is converted to a service user ID using the print service user information table 800, and it is determined whether or not there is a set of the service user ID and the image processing apparatus ID in the image processing apparatus public setting information table 900. The phrase "there is an association between an image processing apparatus user and a print service user" refers to that the user can log in to the print service (the information processing apparatus 200) via the image processing apparatus 100. Explaining with the example of FIG. 9, Suzuki of the service user number: 50501 can log in from the image processing apparatus 100 of the image processing apparatus number: 3001, whereas Sato of the service user number: 50503 cannot log in from the image processing apparatus 100 of the image processing apparatus number: 3001.

In step S1116, a selection of a printing method is received. Specifically, the selection is one of the user authentication print and the reservation number print in the print service.

In step S1118, it is determined whether or not the user authentication print has been selected. When it is determined that the user authentication print has been selected, the process proceeds to step S1124. Otherwise, the process proceeds to step S1120.

In step S1120, it is determined whether or not the reservation number print has been selected. When it is determined that the reservation number print has been selected, the process proceeds to step S1122. Otherwise, the process returns to step S1116.

Figure 12:
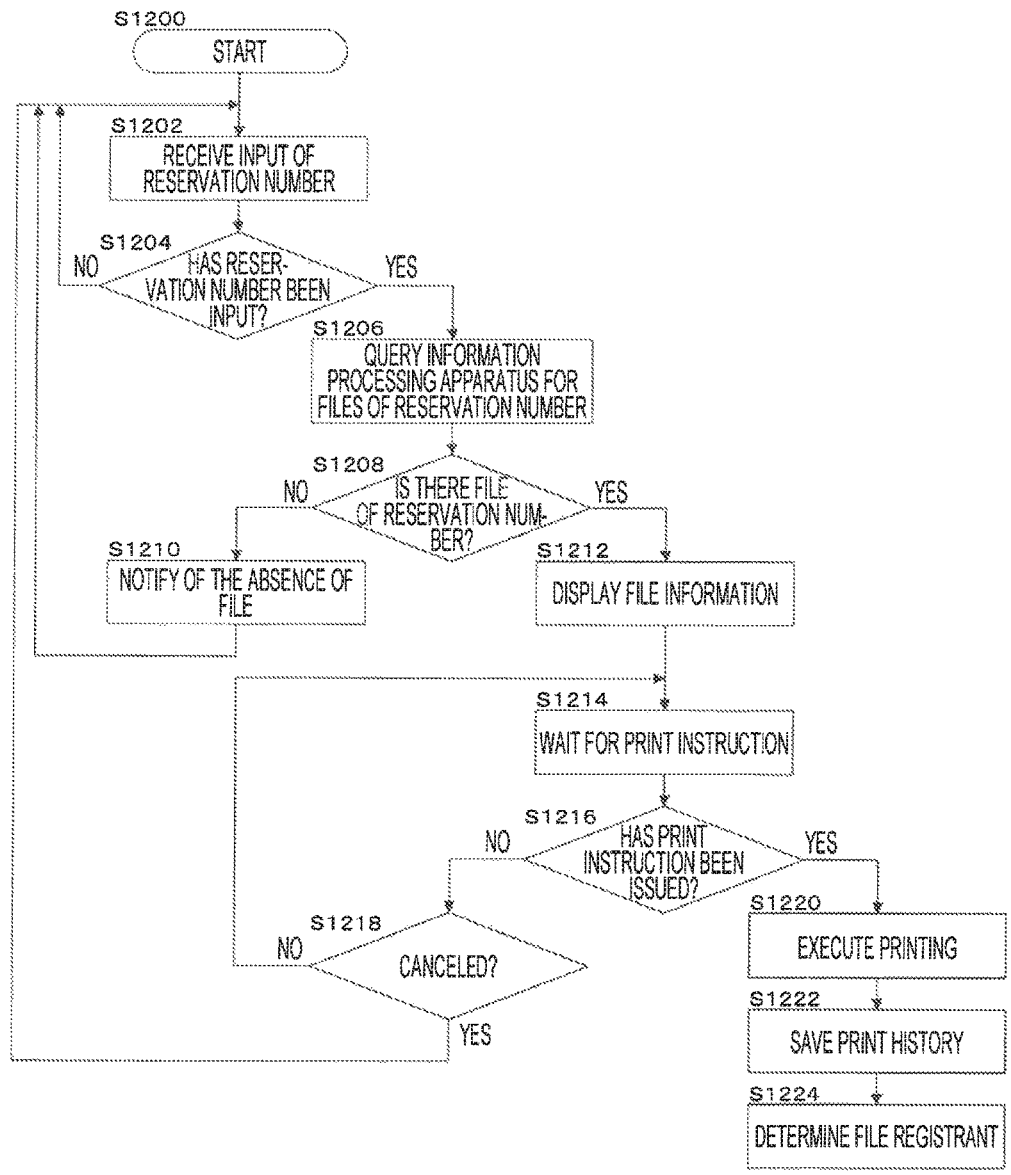
FIG. 12 is a flowchart illustrating an example of processing by the image processing apparatus.

In step S1122, the reservation number printing function is executed. A process according to a flowchart illustrated in the example of FIG. 12 is performed.

In step S1124, the image processing apparatus 100 receives an input of authentication information of the print service (the information processing apparatus 200) from the user.

In step S1126, it is determined whether or not the authentication information has been input. When it is determined that the authentication information has been input, the process proceeds to step S1130. Otherwise, the process returns to step S1124.

In step S1128, the authentication information in the print service (the information processing apparatus 200) is read. The user may be allowed to input a password of the print service. Alternatively, as described above, the image processing apparatus 100 may automatically transmit the password of the print service (the information processing apparatus 200) to the information processing apparatus 200.

In step S1130, the user logs in to the information processing apparatus 200.

In step S1132, it is determined whether or not the log-in is successful. When it is determined that the log-in is successful, the process proceeds to step S1134. Otherwise, the process returns to step S1124.

In step S1134, the user authentication printing function is executed. For example, the image processing apparatus 100 receives and presents a list of documents registered by the user in the print service (the information processing apparatus 200) to the user. Then, the user selects a document to be printed, the information processing apparatus 200 transmits the selected document to the image processing apparatus 100, and the image processing apparatus 100 prints the document.

FIG. 12 is a flowchart illustrating an example of processing by the image processing apparatus 100. FIG. 12 illustrates one processing example of step S1122 of the flowchart illustrated in the example of FIG. 11.

In step S1202, the reservation number print module 130 receives an input of a reservation number by an operation of the user.

In step S1204, it is determined whether or not the reservation number has been input. When it is determined that the reservation number has been input, the process proceeds to step S1206. Otherwise, the process returns to step S1202.

In step S1206, the information processing apparatus 200 is queried for a file (document) of the reservation number. The information processing apparatus 200 refers to the file information table 1000 to determine whether or not there is a file corresponding to the reservation number.

In step S1208, it is determined whether or not there is a file of the reservation number. When it is determined that there is a file of the reservation number, the process proceeds to step S1212. Otherwise, the process proceeds to step S1210.

In step S1210, the absence of a file is notified, and the process returns to step S1202.

In step S1212, file information (e.g., a file name, a document thumbnail image, etc.) is displayed. The information processing apparatus 200 transmits a file, file information and a service user ID (registrant) to the image processing apparatus 100. Specifically, the information processing apparatus 200 transmits a service user ID (registrant) extracted from the file information table 1000 (service user ID (registrant) column 1050) to the image processing apparatus 100. Then, in step S1212, the image processing apparatus 100 displays the file information. At this time, the file is a print target in step S1220, and the service user ID (registrant) becomes a storage target as a print history in step S1222.

In step S1214, the image processing apparatus 100 waits for a print instruction by a user's operation.

In step S1216, it is determined whether or not the print instruction has been issued. When it is determined that the print instruction has been issued, the process proceeds to step S1220. Otherwise, the process proceeds to step S1218.

In step S1218, it is determined whether or not there is a cancellation. When it is determined that there is a cancellation, the process returns to step S1202. Otherwise, the process returns to step S1214.

In step S1220, printing of the document is executed.

In step S1222, the print history (e.g., date/time, an image processing apparatus user ID, reservation number, service user ID (registrant)) is saved. Specifically, a row is added to the reservation number print history table 500.

In step S1224, a file registrant is determined. A process according to a flowchart illustrated in the example of FIG. 13 is performed.

Figure 13:
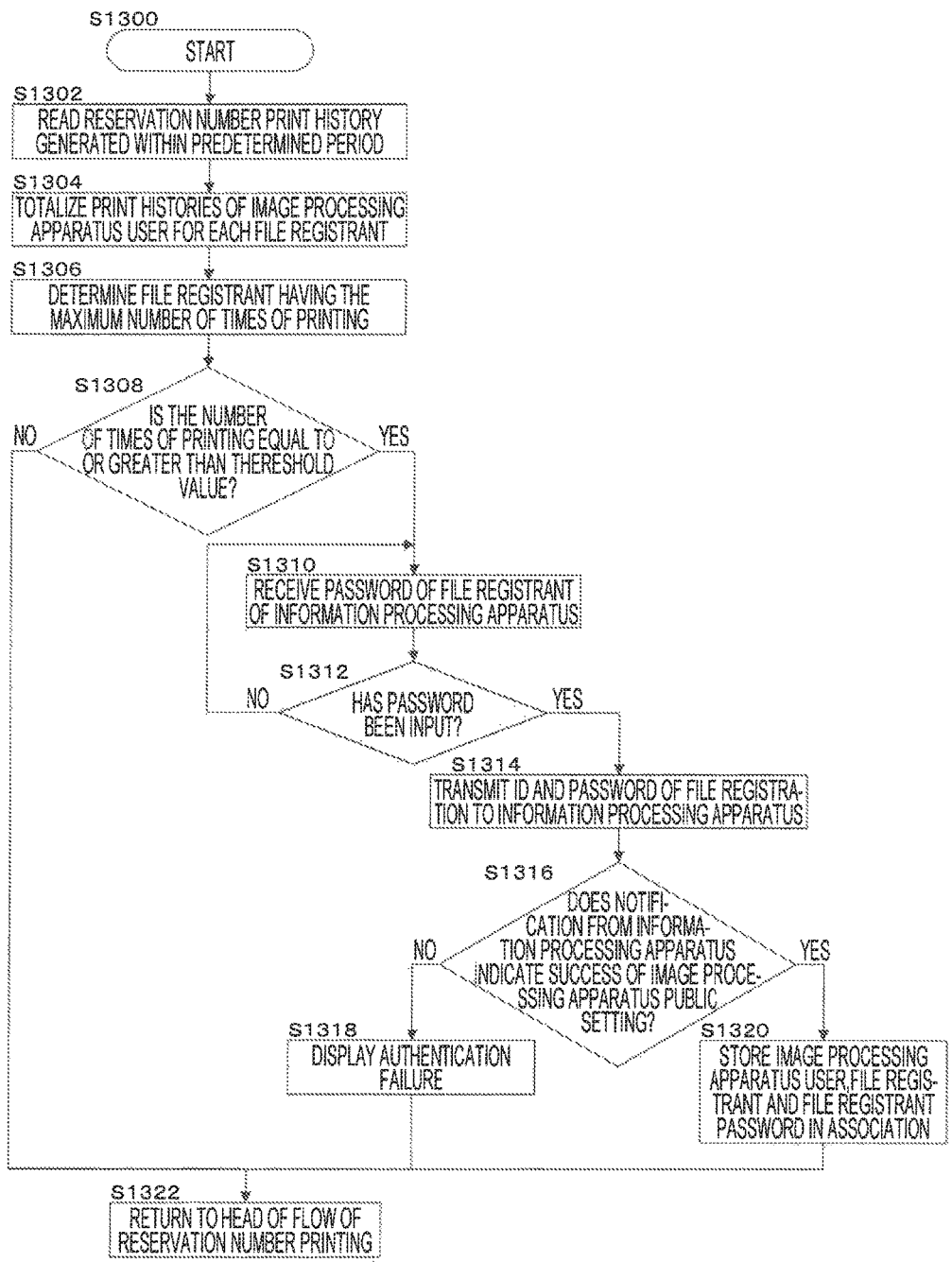
FIG. 13 is a flowchart illustrating an example of processing by the image processing apparatus.

FIG. 13 is a flowchart illustrating an example of processing by the image processing apparatus 100. FIG. 13 illustrates one processing example of step S1224 of the flowchart illustrated in the example of FIG. 12, which is a file registrant determining process in the image processing apparatus 100.

In step S1302, a reservation number print history generated within a certain period is read. For example, data within a recent predetermined period is extracted from the reservation number print history table 500.

In step S1304, the print histories of the image processing apparatus user are totalized for each file registrant (service user ID (registrant) column 540).

In step S1306, a file registrant having the maximum number of times of printing is determined.

In step S1308, it is determined whether or not the number of times of printing is equal to or greater than a threshold value. When it is determined that the number of times of printing is equal to or greater than the threshold value, the process proceeds to step S1310. Otherwise, the process proceeds to step S1322. For example, when the threshold value is set to three, as described above, since the service user ID: 50503 outputs (prints) the registered document three times in the reservation number print history table 500 illustrated in the example of FIG. 5, this user (service user ID: 50503 and image processing apparatus user ID: 11) is a target of a user who can log in from the image processing apparatus 100 to the print service (information processing apparatus 200).

Figure 15:
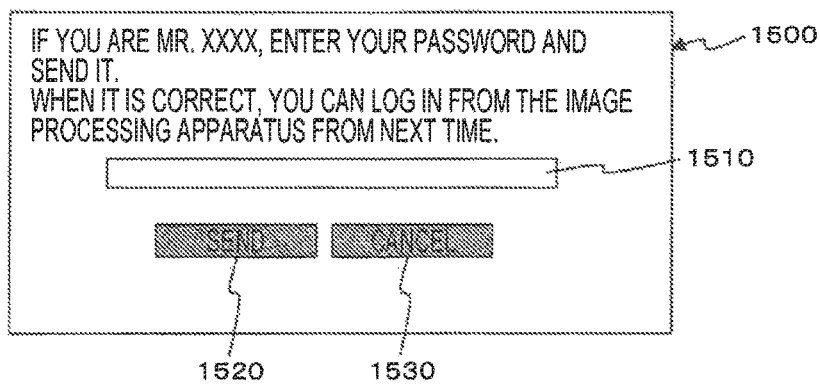
FIG. 15 is an explanatory view illustrating an example of display of a password input screen.

In step S1310, a password of the file registrant of the information processing apparatus 200 is received. For example, the image processing apparatus 100 presents a password input screen 1500 on a display device such as a liquid crystal display of the image processing apparatus 100. FIG. 15 is an explanatory view illustrating an example of display of the password input screen 1500. On the password input screen 1500 are displayed a password input field 1510, a send button 1520 and a cancel button 1530.

On the password input screen 1500 is displayed a message, for example, "If you are Mr. XXXX, enter your password and send it. When it is correct, you can log in from the image processing apparatus from next time". This "Mr. XXXX" is a target file registrant (a user name registered in the print service). The password to be input is a password registered in the print service (information processing apparatus 200). When the password is correct, it is possible to automatically log in from the image processing apparatus 100 to the print service (information processing apparatus 200) from the next time.

In step S1312, it is determined whether or not the password has been input. When it is determined that the password has been input, the process proceeds to step S1314. Otherwise, the process returns to step S1310.

In step S1314, an ID of file registration (file registrant ID) and the password are transmitted to the information processing apparatus 200. Of course, the serial number of this image processing apparatus 100 is also transmitted. Thereafter, the information processing apparatus 200 performs a process according to the flowchart illustrated in the example of FIG. 14.

In step S1316, it is determined whether or not a notification from the information processing apparatus 200 indicates a success (approval) of the image processing apparatus public setting. When it is determined that the image processing apparatus public setting is successful, the process proceeds to step S1320. Otherwise, the process proceeds to step S1318.

In step S1318, authentication failure is displayed.

In step S1320, an image processing apparatus user, a file registrant and a file registrant password are stored in association. More specifically, a row is added to the image processing apparatus/print service user association information table 600 to create an image processing apparatus/print service user association information table 1600. FIG. 16 is an explanatory view illustrating a data structure example of the image processing apparatus/print service user association information table 1600. The image processing apparatus/print service user association information table 1600 has an image processing apparatus user ID column 1610, a service user ID (registrant) column 1620 and a password hash column 1630. The image processing apparatus user ID column 1610 stores an image processing apparatus user ID. The service user ID (registrant) column 1620 stores a service user ID (registrant). The password hash column 1630 stores a password hash. The image processing apparatus/print service user association information table 1600 corresponds to the image processing apparatus/print service user association information table 600 after it is determined that the user of the image processing apparatus user ID: 11 is the same person as the service user ID: 50503 (after the processing of step S1320). That is, a second row is added to the image processing apparatus/print service user association information table 600.

In step S1322, the process returns to the head of the flow of the reservation number printing. That is, the process returns to the head of the flowchart illustrated in the example of FIG. 12.

Figure 14:
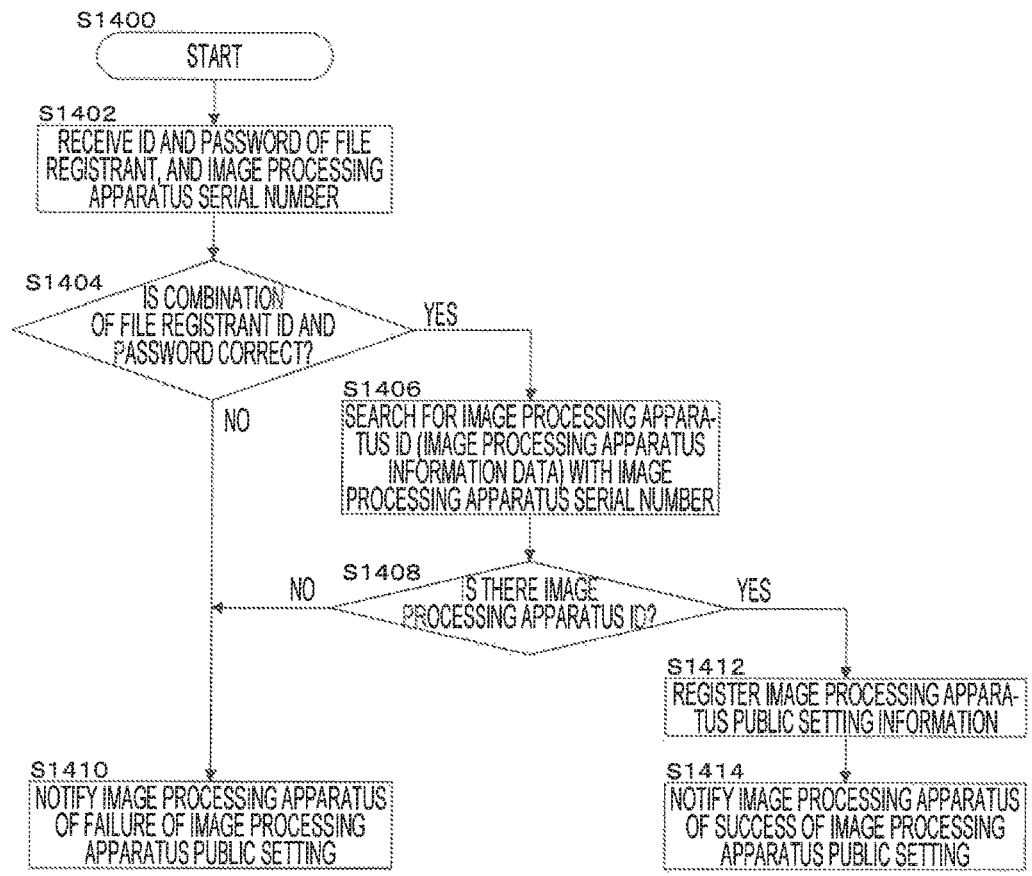
FIG. 14 is a flowchart illustrating an example of processing by the information processing apparatus.

FIG. 14 is a flowchart illustrating an example of processing by the information processing apparatus 200. This figure illustrates a process by the information processing apparatus 200 after step S1314 of the flowchart illustrated in the example of FIG. 13.

In step S1402, the ID and password of a file registrant and the serial number of the image processing apparatus 100 are received from the image processing apparatus 100.

In step S1404, it is determined whether or not a combination of the file registrant ID and password is correct. When it is determined that a combination of the file registrant ID and password is correct, the process proceeds to step S1406. Otherwise, the process proceeds to step S1410. This process is authentication as a user in the information processing apparatus 200.

In step S1406, the image processing apparatus ID (the image processing apparatus information table 700 in the image processing apparatus information storage module 210) is searched for with the serial number of the image processing apparatus 100.

In step S1408, it is determined whether or not there is an image processing apparatus ID. When it is determined that there is an image processing apparatus ID, the process proceeds to step S1412. Otherwise, the process proceeds to step S1410.

In step S1410, the image processing apparatus 100 is notified of the failure of the image processing apparatus public setting. Thereafter, the processing by step S1316 of the flowchart illustrated in the example of FIG. 13 is performed.

In step S1412, the image processing apparatus public setting information is registered. Specifically, a row is added to the image processing apparatus public setting information table 900 to create an image processing apparatus public setting information table 1700. FIG. 17 is an explanatory view illustrating a data structure example of the image processing apparatus public setting information table 1700. The image processing apparatus public setting information table 1700 has an image processing apparatus ID column 1710 and a service user ID column 1720. The image processing apparatus ID column 1710 stores an image processing apparatus ID. The service user ID column 1720 stores a service user ID. The image processing apparatus public setting information table 1700 corresponds to the image processing apparatus public setting information table 900 after the service user ID: 50503 is set to be able to log in from the image processing apparatus 100 of the image processing apparatus ID: 3001 to the information processing apparatus 200 (after the processing of step S1412). That is, a seventh row is added to the image processing apparatus public setting information table 900.

In step S1414, the image processing apparatus 100 is notified of the success of the image processing apparatus public setting. Thereafter, the processing by step S1316 of the flowchart illustrated in the example of FIG. 13 is performed.

A hardware configuration example of the image processing apparatus 100 and the information processing apparatus 200 according to the exemplary embodiment will be described below with reference to FIG. 18. FIG. 18 illustrates the configuration implemented by a personal computer (PC) and shows a hardware configuration example including a data reading unit 1817 such as a scanner, and a data output unit 1818 such as a printer.

A central processing unit (CPU) 1801 is a controller for executing processes in accordance with a computer program that describes execution sequences of the various modules described in the above exemplary embodiment, that is, the image processing apparatus user authentication module 105, the print service module 115, the print service activation module 120, the user authentication print module 125, the reservation number print module 130, the image processing apparatus public setting module 135, the file registrant determination module 140, the image processing apparatus discrimination module 205, the user authentication module 215, the access control module 225, the image processing apparatus public setting module 235, the file registration module 240, the user authentication print module 245, the reservation number print module 250 and the like.

A read only memory (ROM) 1802 stores programs, calculation parameters and the like used by the CPU 1801. A random access memory (RAM) 1803 stores programs to be used in execution of the CPU 1801, parameters that are appropriately changed in the execution, and the like. These are interconnected by a host bus 1804 including a CPU bus or the like.

The host bus 1804 is connected to an external bus 1806 such as a peripheral component interconnect/interface (PCI) bus via a bridge 1805.

A keyboard 1808 and a pointing device 1809 such as a mouse are devices operated by an operator. A display 1810 includes a liquid crystal display device, a cathode ray tube (CRT) and the like and displays various information as text and image information. Further, a touch screen or the like having both functions of the pointing device 1809 and the display 1810 may be employed.

A hard disk drive (HDD) 1811 incorporates and drives a hard disk (or a flash memory or the like) to record or reproduce programs and information to be executed by the CPU 1801. The hard disk realizes the functions as the image processing apparatus user information storage module 110, the image processing apparatus/print service user association information storage module 145, the reservation number print history storage module 150, the image processing apparatus information storage module 210, the print service user information storage module 220, the image processing apparatus public setting information storage module 230, the file information storage module 255 and the like. In addition, other various data, various computer programs and the like are stored in the hard disk.

A drive 1812 reads data or a program recorded on a removable recording medium 1813 such as a mounted magnetic disk, optical disc, magneto-optical disc, semiconductor memory or the like, and transfers the data or program to the RAM 1803 connected via an interface 1807, the external bus 1806, the bridge 1805 and the host bus 1804. The removable recording medium 1813 can also be used as a data recording area.

A connection port 1814 is a port for connecting an external connection device 1815 and has a connection part such as USB, IEEE1394 or the like. The connection port 1814 is connected to the CPU 1801 and the like via the interface 1807, the external bus 1806, the bridge 1805, the host bus 1804 and the like. A communication unit 1816 having a function as the communication module 160 and the communication module 265 is connected to a communication line and executes a process of data communication with the outside. The data reading unit 1817 is, for example, a scanner and executes a document reading process. The data output unit 1818 having a function as the print module 155 is, for example, a printer and executes a document data outputting process.

The hardware configuration of the image processing apparatus 100 and the information processing apparatus 200 illustrated in FIG. 18 is just one configuration example. The exemplary embodiment is not limited to the configuration illustrated in FIG. 18 but may have any configuration as long as it can execute the modules described in the exemplary embodiment. For example, some of the modules may be configured with dedicated hardware (e.g., an application specific integrated circuit (ASIC), etc.), while some of the modules may be interconnected in an external system via a communication line. Alternatively, the plural systems illustrated in FIG. 18 may be interconnected via a communication line so as to cooperate with each other. Particularly, the modules may be incorporated in a portable information communication device (including a mobile phone, a smartphone, a mobile device, a wearable computer, etc.), an information home appliance, a robot, a copier, a facsimile, a scanner, a printer, a multifunction machine (an image processing apparatus having at least two of functions of a scanner, a printer, a copier and a facsimile) or the like, in addition to a personal computer.

The above-described programs may be provided in the form of a recording medium or may be provided through a communication unit. In that case, for example, the above-described programs may be grasped as the invention of "a computer-readable recording medium having a program recorded therein".

The "computer-readable recording medium having a program recorded therein" used herein refers to a computer-readable recording medium in which a program is recorded, which is used for installation, execution, distribution and the like of programs.

Examples of the recording medium may include a digital versatile disc (DVD) such as "DVD-R, DVD-RW, DVD-RAM, etc." which are standards formulated by the DVD Forum or "DVD+R, DVD+RW, etc." which are standards formulated by the DVD+RW, a compact disc (CD) such as CD-ROM, CD recordable (CD-R), CD rewritable (CD-RW) or the like, a Blu-ray (registered trademark) disc, a magneto-optical disc (MO), a flexible disc (FD), a magnetic tape, a hard disk, a read only memory (ROM), an electrically erasable and rewritable read only memory (EEPROM (registered trademark)), a flash memory, a random access memory (RAM), a SD (Secure Digital) memory card, and the like.

All or some of the above-described programs may be stored or distributed in the form of a recording medium. In addition, all or some of the above-described programs may be transmitted by communication using a transmission medium such as a wired network or wireless communication network used for a local area network (LAN), a metropolitan area network (MAN), a wide area network (WAN), the internet, an intranet, an extranet or the like, or a combination thereof, or may be carried on a carrier wave.

Further, the above-described programs may be a part or the whole of another program, or may be recorded on a recording medium together with a separate program. Furthermore, the above-described programs may be separately recorded in plural recording media. Moreover, the above-described programs may be recorded in any form such as compression or encryption as long as they can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising a processor programmed to function as:
    a reservation number printing module that receives reservation numbers input to the image processing apparatus and causes documents on the print service processing apparatus corresponding to the reservation numbers to be printed by the image processing apparatus without logging in to the print services apparatus;
    a request unit that requests a print service processing apparatus to register a user who makes a reservation printing as a user who can log in to the print service processing apparatus from the image processing apparatus when the number of times of the reservation printing meets a predetermined condition, wherein
        the predetermined condition includes the number of times of reservation printing being at least two times, and
        the number of times of the reservation printing meets a predetermined condition is determined, at least in part, by comparing users associated with a plurality of documents printed using reservation printing to user IDs of users who performed one or more reservation printings including the plurality of documents; and
    a setting unit that sets the user to be able to log in to the print service processing apparatus upon receiving an approval for the request for registration.

2. The image processing apparatus according to claim 1, wherein the number of times of the reservation printing is counted for each registrant of a document which is a subject of the reservation printing.

3. The image processing apparatus according to claim 2, wherein the request unit requests the print service processing apparatus to register the registrant as the user who is able to log in to the print service processing apparatus.

4. The image processing apparatus according to claim 1, wherein a user logging in to the image processing apparatus is allowed to designate the reservation printing when the log-in user is not the user who is able to log in to the print service processing apparatus.

5. The image processing apparatus according to claim 4, wherein, when the user logging in to the image processing apparatus is the user who is able to log in to the print service processing apparatus, the log-in user logs in to the print service processing apparatus according to the setting.

6. An image processing system comprising:
the image processing apparatus according to claim 1; and
the print service processing apparatus that receives the request for registration from the image processing apparatus and sets the user as the user who is able to log in from the image processing apparatus when the user is the user who is able to log in to the print service processing apparatus, the print service processing apparatus including a transmitting unit to transmit a message of the approval to the image processing apparatus.

7. An image processing method comprising:
receiving reservation numbers input to the image processing apparatus;
printing documents on a print service processing apparatus corresponding to the received reservation numbers without logging in to the print services apparatus;
requesting the print service processing apparatus to register a user who makes a reservation printing as a user who can log in to the print service processing apparatus from an image processing apparatus when the number of times of the reservation printing meets a predetermined condition, wherein
    the predetermined condition includes the number of times of reservation printing being at least two times, and
    the number of times of the reservation printing meets a predetermined condition is determined, at least in part, by comparing users associated with a plurality of documents printed using reservation printing to user IDs of users who performed one or more reservation printings including the plurality of documents; and
setting the user to be able to log in to the print service processing apparatus upon receiving an approval for the request for registration.

8. A non-transitory computer readable medium storing a program causing a computer to execute image processing comprising:
receiving reservation numbers input to the image processing apparatus;
printing documents on a print service processing apparatus corresponding to the received reservation numbers without logging in to the print services apparatus;
requesting the print service processing apparatus to register a user who makes a reservation printing as a user who can log in to the print service processing apparatus from an image processing apparatus when the number of times of the reservation printing meets a predetermined condition, wherein
    the predetermined condition includes the number of times of reservation printing being at least two times, and
    the number of times of the reservation printing meets a predetermined condition is determined, at least in part, by comparing users associated with a plurality of documents printed using reservation printing to user IDs of users who performed one or more reservation printings including the plurality of documents; and
setting the user to be able to log in to the print service processing apparatus upon receiving an approval for the request for registration.

* * * * *